US012698717B2

(12) United States Patent
Lavine et al.

(10) Patent No.: US 12,698,717 B2
(45) Date of Patent: Aug. 4, 2026

(54) GAS TURBINE ENGINE ROTOR BLADE TRANSITION

(71) Applicant: RTX Corporation, Farmington, CT (US)

(72) Inventors: Griffin D. Lavine, South Glastonbury, CT (US); David R. Pack, Gold Canyon, AZ (US); Brandon W. Spangler, Vernon, CT (US); Jennifer H. Archambeau, Ludlow, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/953,979

(22) Filed: Nov. 20, 2024

(65) Prior Publication Data

US 2026/0139598 A1 May 21, 2026

(51) Int. Cl.
*F01D 5/18* (2006.01)

(52) U.S. Cl.
CPC ............. *F01D 5/186* (2013.01); *F01D 5/189* (2013.01); *F05D 2220/32* (2013.01); *F05D 2240/30* (2013.01); *F05D 2260/202* (2013.01)

(58) Field of Classification Search
CPC .......... F01D 5/186; F01D 5/187; F01D 5/188; F01D 5/189; F05D 2260/20; F05D 2260/202; F05D 2260/204
See application file for complete search history.

(56) References Cited

U.S. PATENT DOCUMENTS

| | | | | |
|---|---|---|---|---|
| 5,720,431 A * | 2/1998 | Sellers | F01D 5/186 416/96 A |
| 7,556,476 B1 | 7/2009 | Liang | |
| 9,551,228 B2 | 1/2017 | Propheter-Hinckley | |
| 10,024,171 B2 | 7/2018 | Itzel | |
| 11,149,550 B2 | 10/2021 | Spangler | |
| 2007/0048136 A1* | 3/2007 | Boury | F01D 5/187 416/97 R |
| 2018/0051569 A1* | 2/2018 | Bunker | F01D 5/186 |
| 2019/0024515 A1 | 1/2019 | Marsh | |
| 2019/0093487 A1 | 3/2019 | Marsh | |
| 2021/0054746 A1* | 2/2021 | Spangler | F01D 5/189 |
| 2021/0140323 A1* | 5/2021 | Spangler | F01D 9/065 |
| 2021/0148235 A1* | 5/2021 | Spangler | F01D 5/187 |

FOREIGN PATENT DOCUMENTS

WO 2017105379 A1 6/2017

* cited by examiner

*Primary Examiner* — Christopher Verdier
(74) *Attorney, Agent, or Firm* — Getz Balich LLC

(57) ABSTRACT

A rotor blade for a gas turbine engine is provided that includes an airfoil, an attachment section, and a neck section. The airfoil includes a plurality of internal cooling air passages. The attachment section has a base surface. A forward center cooling air passage is open at the base surface and extends through the attachment and neck sections. An aft center cooling air passage is open at the base surface and extends through the attachment and neck sections. A W2W cooling air passage is open at the base surface and extends through the attachment and neck sections. The W2W cooling air passage is disposed between the forward and aft center cooling air passages. In a transition in a direction from a cross-sectional plane disposed in the attachment section to the airfoil root end, a side segment progressively extends outwardly from the W2W cooling air passage.

18 Claims, 14 Drawing Sheets

GAS TURBINE ENGINE ROTOR BLADE TRANSITION

BACKGROUND OF THE INVENTION

1. Technical Field

The present disclosure relates gas turbine engines in general and to gas turbine engine rotor blades in particular.

2. Background Information

A gas turbine engine rotor stage includes a disk rotatable about an axial centerline, with a plurality of rotor blades that extend radially out from the disk. Each rotor blade includes an attachment section, a neck section, and an airfoil. The neck section is disposed between the attachment section extends and the airfoil. The exterior of the attachment section is configured as a portion of a mating couple that mechanically engages the rotor blade with the disk. During operation of the gas turbine engine, the attachment section is subject to considerable mechanical loading. The airfoil is hollow with internal structure that defines internal cooling air passages. A plurality of cooling air passages extend radially upward through the attachment section, and through the neck section, and are in fluid communication with cooling air passages disposed within the airfoil. What is needed is a cooling passage improvement that facilitates passing cooling air through the attachment and neck sections and into the airfoil.

SUMMARY

According to an aspect of the present disclosure, a rotor blade for a gas turbine engine is provided that includes a suction side, a pressure side, an airfoil, an attachment section, and a neck section. The airfoil extends radially between a tip end and an airfoil root end, and includes a plurality of internal cooling air passages. The attachment section has a base surface. The neck section is disposed between the attachment section and the airfoil. A forward center cooling air passage is open at the base surface and extends through the attachment section and the neck section and is in fluid communication with the plurality of internal cooling air passages. An aft center cooling air passage is open at the base surface and extends through the attachment section and the neck section and is in fluid communication with the plurality of internal cooling air passages. A wall to wall (W2W) cooling air passage is open at the base surface and extends through the attachment section and the neck section and is in fluid communication with the plurality of internal cooling air passages. The W2W cooling air passage is disposed between the forward center cooling air passage and the aft center cooling air passage. In a transition in a direction from a cross-sectional plane disposed in the attachment section to the airfoil root end, a side segment progressively extends outwardly from the W2W cooling air passage.

In any of the aspects or embodiments described above and herein, in a first cross-sectional plane that extends through the neck section and is perpendicular to the W2W cooling air passage, the side segment may have a first length L1 and a first area A1, and in a second cross-sectional plane that extends through the neck section and is perpendicular to the W2W cooling air passage, the side segment may have a second length L2 and a second area A2, and the first cross-sectional plane may be spaced apart from the airfoil root end a first distance D1, and the second cross-sectional plane may be spaced apart from the airfoil root end a second distance D2, and the first distance D1 may be greater than the second distance D2, and the second area A2 may be greater than the first area A1.

In any of the aspects or embodiments described above and herein, the second length L2 may be greater than the first length L1.

In any of the aspects or embodiments described above and herein, in a third cross-sectional plane that extends through the neck section and is perpendicular to the W2W cooling air passage, the side segment may have a third length L3 and a third area A3, and the third cross-sectional plane may be spaced apart from the airfoil root end a third distance D3, and the third distance D3 may be less than the second distance D2, and the third area A3 may be greater than the second area A2.

In any of the aspects or embodiments described above and herein, at the third cross-sectional plane, a portion of the side segment may be disposed outside of the forward center cooling air passage, and the portion of the side segment may be disposed between the forward center cooling air passage and a suction side surface of the neck section.

In any of the aspects or embodiments described above and herein, at the third cross-sectional plane, a portion of the side segment may be disposed outside of the aft center cooling air passage, and the portion of the side segment may be disposed between the aft center cooling air passage and a pressure side surface of the neck section.

In any of the aspects or embodiments described above and herein, in a first cross-sectional plane that extends through the neck section and is perpendicular to the W2W cooling air passage, the side segment may have a first length L1 and a first area A1, and in a second cross-sectional plane that extends through the neck section and is perpendicular to the W2W cooling air passage, the side segment may have a second length L2 and a second area A2, and the first cross-sectional plane may be spaced apart from the airfoil root end a first distance D1, and the second cross-sectional plane may be spaced apart from the airfoil root end a second distance D2, and the first distance D1 may be greater than the second distance D2, and the second length L2 may be greater than the first length L1.

In any of the aspects or embodiments described above and herein, the forward center cooling air passage may be separated from the W2W cooling air passage by a first separation distance at the base surface, and the W2W cooling air passage may include a central segment at the airfoil root end, and at the airfoil root end the forward center cooling air passage may be separated from the central segment by a second separation distance, and the first separation distance may deviate from the second separation distance by fifteen percent or less.

In any of the aspects or embodiments described above and herein, the aft center cooling air passage may be separated from the W2W cooling air passage by a first separation distance at the base surface, and the W2W cooling air passage may include a central segment at the airfoil root end, and at the airfoil root end the aft center cooling air passage may be separated from the central segment by a second separation distance, and the first separation distance may deviate from the second separation distance by fifteen percent or less.

In any of the aspects or embodiments described above and herein, the W2W cooling air passage may have a first total cross-sectional area at the base surface, and the W2W cooling air passage may have a second total cross-sectional area at the airfoil root end, and the first total cross-sectional area may deviate from the second total cross-sectional area by fifteen percent or less.

In any of the aspects or embodiments described above and herein, the forward center cooling air passage may have a first total cross-sectional area at the base surface, and the forward center cooling air passage may have a second total cross-sectional area at the airfoil root end, and the first total cross-sectional area may deviate from the second total cross-sectional area by fifteen percent or less.

In any of the aspects or embodiments described above and herein, the aft center cooling air passage may have a first total cross-sectional area at the base surface, and the aft center cooling air passage may have a second total cross-sectional area at the airfoil root end, and the first total cross-sectional area may deviate from the second total cross-sectional area by fifteen percent or less.

According to an aspect of the present disclosure, a rotor blade for a gas turbine engine is provided that includes a suction side, a pressure side, and airfoil, an attachment section, and a neck section. The airfoil extends radially between a tip end and an airfoil root end and includes a plurality of internal cooling air passages. The attachment section has a base surface. The neck section is disposed between the attachment section and the airfoil. A forward center cooling air passage is open at the base surface and extends through the attachment section and the neck section and is in fluid communication with the plurality of internal cooling air passages. An aft center cooling air passage is open at the base surface and extends through the attachment section and the neck section and is in fluid communication with the plurality of internal cooling air passages. A wall to wall (W2W) cooling air passage is open at the base surface and extends through the attachment section and the neck section and is in fluid communication with the plurality of internal cooling air passages. The W2W cooling air passage is disposed between the forward center cooling air passage and the aft center cooling air passage. In a transition in a direction from a cross-sectional plane disposed in the attachment section to the airfoil root end, a suction side segment progressively extends outwardly from the W2W cooling air passage and a pressure side segment progressively extends outwardly from the W2W cooling air passage.

In any of the aspects or embodiments described above and herein, the suction side segment and the pressure side segment are disposed diagonally across from one another.

In any of the aspects or embodiments described above and herein, in a first cross-sectional plane that extends through the neck section and is perpendicular to the W2W cooling air passage, the suction side segment (SSS) may have a first SSS length SSL1 and a first SSS area SSA1, and in a second cross-sectional plane that extends through the neck section and is perpendicular to the W2W cooling air passage, the suction side segment may have a second SSS length SSL2 and a second SSS area SSA2. In the first cross-sectional plane, the pressure side segment (PSS) may have a first PSS length PSL1 and a first PSS area PSA1, and in the second cross-sectional plane, the pressure side segment may have a second PSS length PSL2 and a second PSS area PSA2. The first cross-sectional plane may be spaced apart from the airfoil root end a first distance D1, and the second cross-sectional plane may be spaced apart from the airfoil root end a second distance D2, and the first distance D1 may be greater than the second distance D2. The second SSS area SSA2 may be greater than the first SSS area SSA1 and the second PSS area PSA2 may be greater than the first PSS area PSA1.

In any of the aspects or embodiments described above and herein, the second SSS length SSL2 may be greater than the first SSS length SSL1, and the second PSS length PSL2 may be greater than the first PSS length PSL1.

In any of the aspects or embodiments described above and herein, at the second cross-sectional plane, a portion of the suction side segment may be disposed outside of the forward center cooling air passage on the suction side, and a portion of the pressure side segment may be disposed outside of the aft center cooling air passage on the pressure side.

In any of the aspects or embodiments described above and herein, the suction side segment may include a forward suction side segment and an aft suction side segment, and the pressure side segment may include a forward pressure side segment and an aft pressure side segment.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 81 is a diagrammatic solid body representation of a cooling air passage shown in the sectional views of FIGS. 8-8H.

DETAILED DESCRIPTION

Figure 1:
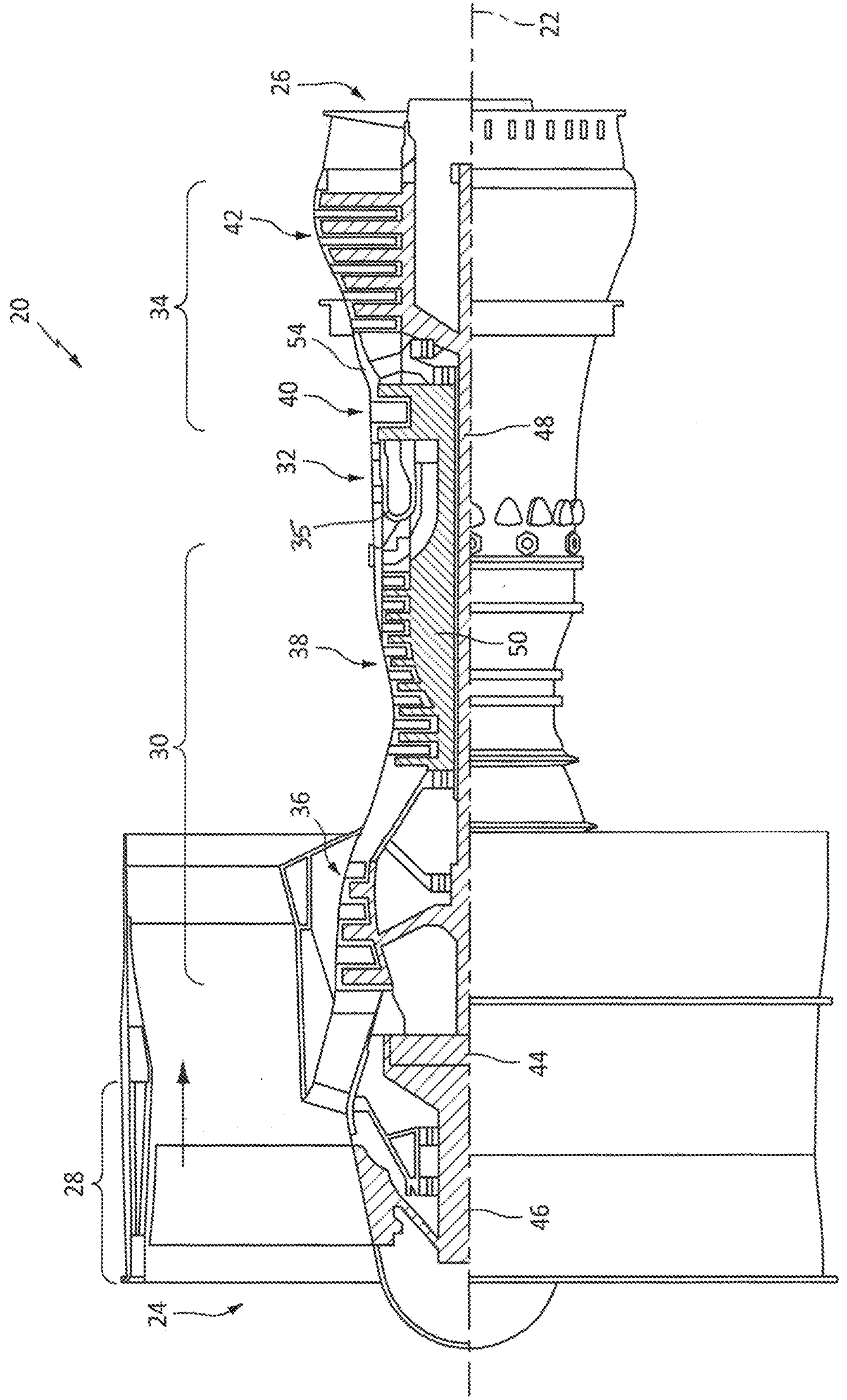
FIG. 1 is a diagrammatic sectional view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes an annular combustor 35. The compressor section includes a low-pressure compressor (LPC) 36 and a high-pressure compressor (HPC) 38. The turbine section 34 includes a high-pressure turbine (HPT) 40 and a low-pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms "forward", "leading", "aft, "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 1, the fan section is "forward" of the compressor section and the turbine section is "aft" of the compressor section. The terms "inner radial" and "outer radial" refer to relative radial positions from the engine centerline. An inner radial component or path is disposed radially closer to the engine centerline than an outer radial component or path.

The gas turbine engine diagrammatically shown in FIG. 1 is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
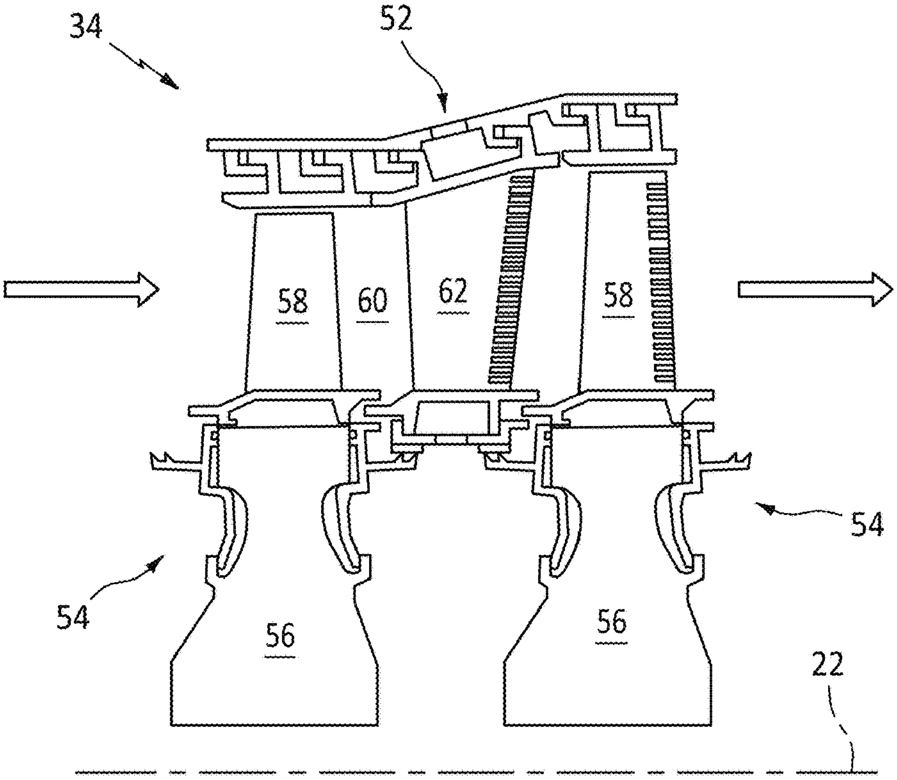
FIG. 2 is a diagrammatic partial illustration of a turbine section embodiment.

FIG. 2 diagrammatically illustrates a portion of a turbine section 34 including a stator vane stage 52 disposed between a pair of rotor stages 54. Each rotor stage 54 includes a disk 56 rotatable about the axial centerline 22 of the engine 20, with a plurality of rotor blades 58 that extend radially out from the disk 56 and into the core gas path 60. Each stator vane stage 52 includes a plurality of stator vanes 62 that extend radially across the core gas path 60 and are circumferentially spaced apart from one another around the engine axial centerline 22. The arrows shown in FIG. 2 illustrate the direction of core gas passing through the turbine section 34 along the core gas path 60. The turbine section 34 shown in FIG. 2 is provided herewith to diagrammatically illustrate an arrangement of rotor stages and stator vane stages within a turbine section 34. The present disclosure is not limited to any turbine section 34 configuration other than as described herein.

Figure 3:
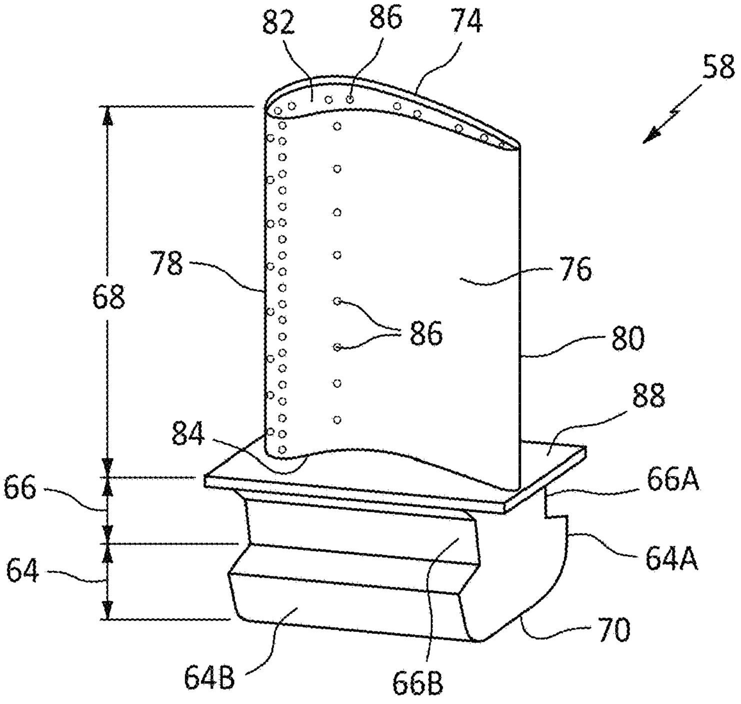
FIG. 3 is a diagrammatic illustration of a rotor blade.
Figure 4:
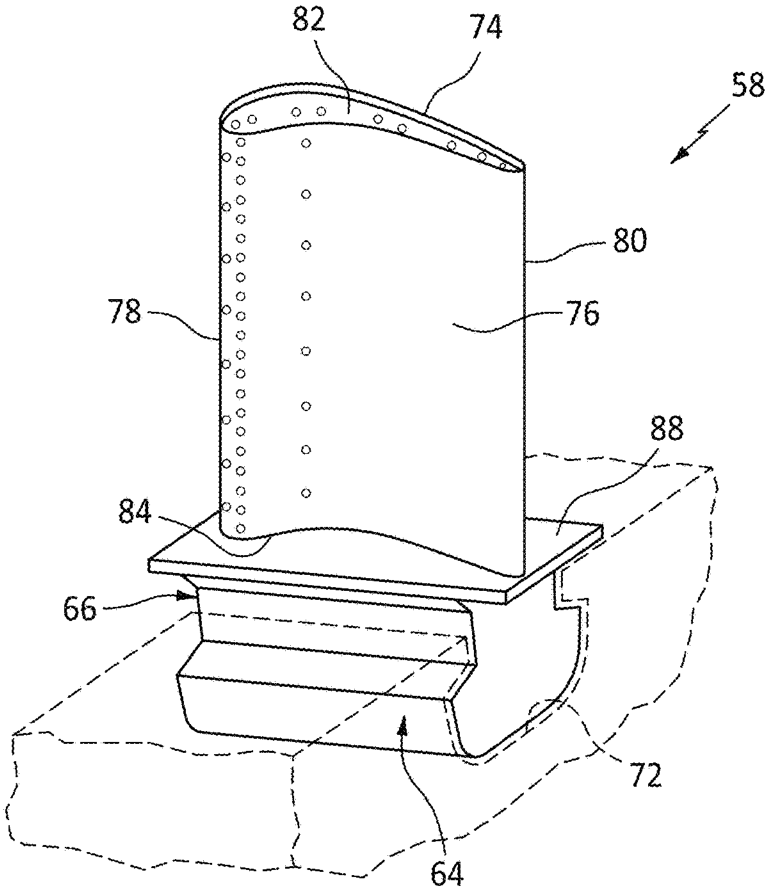
FIG. 4 is a diagrammatic illustration of a rotor blade engaged with a disk.

Referring to FIG. 3, each rotor blade 58 includes an attachment section 64 (sometimes referred to as a "blade root"), a neck section 66, and an airfoil 68. The attachment section 64 extends from a base surface 70 to the neck section 66 and the neck section 66 extends between the attachment section 64 and the airfoil 68. The exterior of the attachment section 64 is configured as a portion of a mating couple that mechanically engages the rotor blade 58 with the disk 56. In the example diagrammatically shown in FIG. 3, the rotor blade 58 includes an attachment section 64 configured as a dovetail. FIG. 4 diagrammatically shows the attachment section 64 engaged with a mating slot 72 disposed within the disk 56. The disk 56 and mating slot 72 are shown in dashed lines in FIG. 4 to permit the rotor blade attachment section 64 to be seen. The dovetail configuration is an example of an attachment section 64 configuration. The present disclosure is not limited to any particular attachment section 64/mating disk slot 72 configuration.

Figure 6:
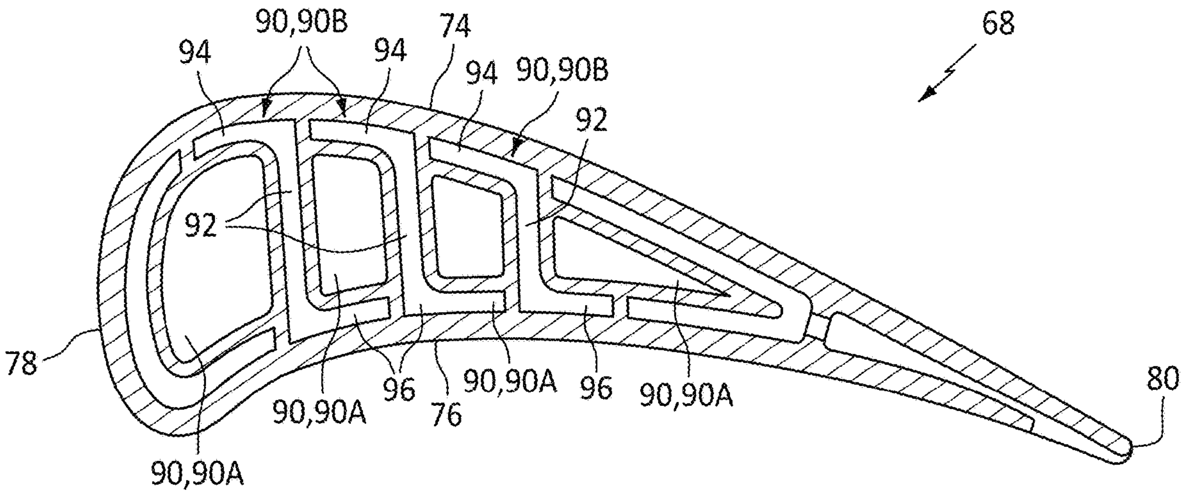
FIGS. 6-6B are diagrammatic sectional views of airfoil embodiments.

Referring back to FIG. 3, the airfoil 68 has a suction side wall 74, a pressure side wall 76, a leading edge 78, a trailing edge 80, a tip end 82, and an airfoil root end 84. The airfoil 68 extends radially between the tip end 82 and the airfoil root end 84. The suction side wall 74 and the pressure side wall 76 extend chordwise between the leading edge 78 and the trailing edge 80. The airfoil 68 is hollow with internal structure that defines internal cooling air passages 90. FIGS. 6-6B provide non-limiting examples of internal structure and cooling air passages 90. As can be seen in FIG. 3, an airfoil 68 may include cooling air apertures 86 in a variety of different positions for cooling purposes.

In the rotor blade 58 embodiment shown in FIG. 3, the rotor blade 58 further includes a platform 88 disposed at the airfoil root end 84 of the airfoil 68 that extends outwardly on the suction side and the pressure side. The rotor blade platforms 88 in a rotor stage 54 collectively define an inner radial flow boundary for the core gas path 60. The present disclosure is not limited to rotor blades 58 that include a platform 88.

Figure 5:
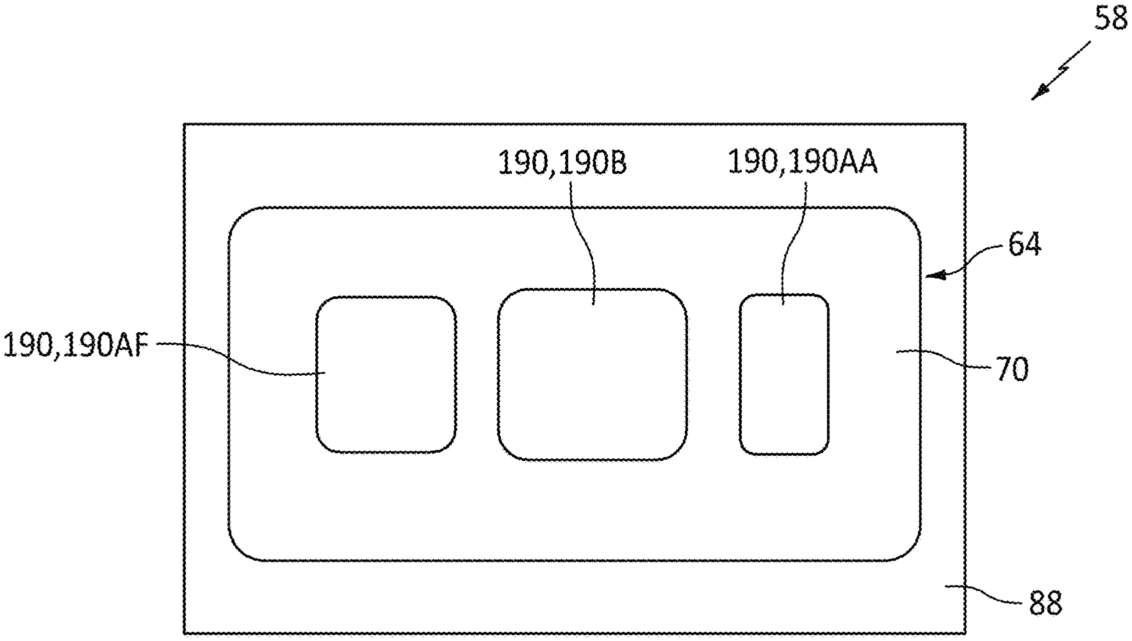
FIG. 5 is a diagrammatic illustration of an end view of a rotor blade.

FIG. 5 is a planar view of the attachment section 64, showing the base surface 70 of the attachment section 64 and portions of the outwardly extending platform 88. The rotor blade 58 includes a plurality of cooling air passages 190 (e.g., including forward center cooling air passage 190AF, aft center cooling air passage 190AA, and W2W cooling air passage 190B as described herein) that are open at the base surface 70 of the attachment section 64 and extend radially outward into the neck section 66. The cooling air passages 190 in the neck section 66 are in fluid communication with internal cooling air passages 90 within the airfoil 68. Referring to FIG. 3, the attachment section 64 includes a suction side surface 64A and a pressure side surface 64B, and the neck section 66 includes a suction side surface 66A and a pressure side surface 66B.

Within the airfoil 68, the internal cooling airfoil passages 90 may include centrally located cooling air passages (e.g., "center cooling air passages 90A") that are spaced apart from the suction side and pressure side walls 74, 76. The center cooling air passages 90A may function as a conduit to other internal cooling air passages that are contiguous with the suction side wall 74 or the pressure side wall 76 of the airfoil 68, and/or as a source of cooling air for cooling apertures 86 disposed in the blade tip end 82 (see FIG. 3), or a flag region (not shown) disposed adjacent the tip end 82 of the airfoil 68. The airfoil 68 may also include cooling air passages that extend between the suction side and the pressure side walls. These cooling air passages are referred to herein as "wall to wall" or "W2W" cooling air passages 90B. The W2W cooling air passages 90 each include a central segment 92 and a suction side segment 94, or a pressure side segment 96, or both a suction side segment 94 and a pressure side segment 96. The central segment 92 is disposed between a pair of the center cooling air passages 90A. The suction side and pressure side segments 94, 96 both extend outwardly away from the central segment 92. The suction side segment 94 is disposed between a center cooling air passage 90A and the suction side wall 74 and is therefore contiguous with the suction side wall 74. The pressure side segment 96 is disposed between a center cooling air passage 90A and the pressure side wall 76 and is therefore contiguous with the pressure side wall 76.

Figure 6A:
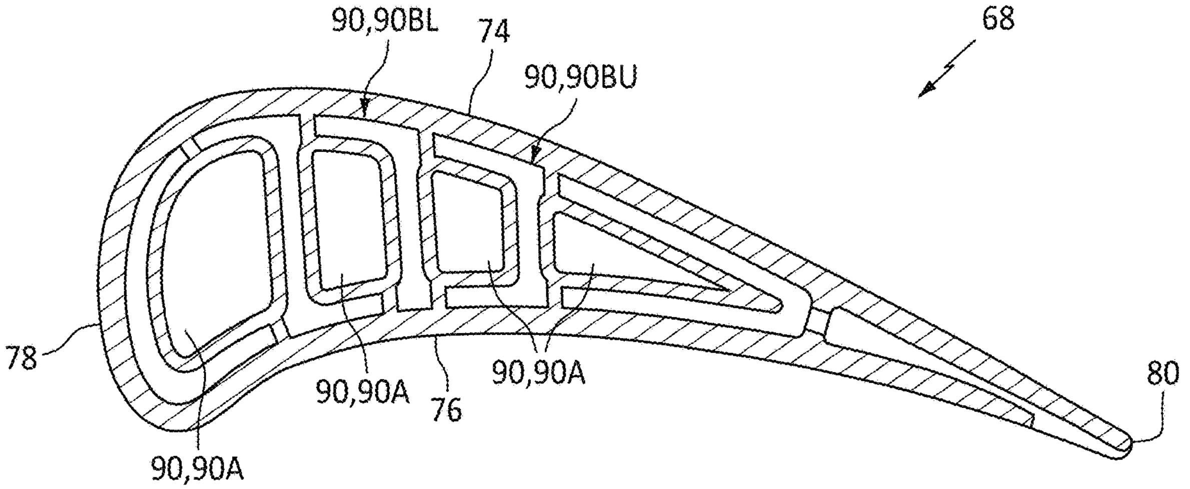
Figure 6B:
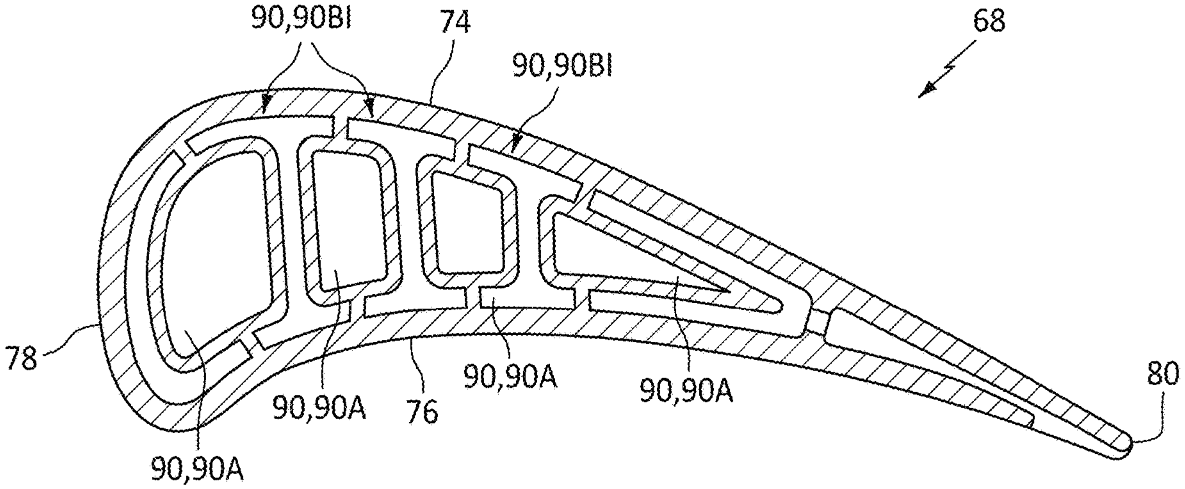

The airfoil 68 embodiment shown in FIG. 6A includes an L-shaped W2W cooling air passage 90BL and a U-shaped W2W cooling air passage 90BU. The airfoil 68 embodiment shown in FIG. 6B includes I-shaped W2W cooling air passages 90BI. The airfoil 68 cooling air passage examples shown in FIGS. 6-6B are provided to illustrate airfoil 68 embodiments and the present disclosure is not limited thereto.

The attachment section 64 and neck section 66 of a rotor blade 58, which include cooling air passages 190 that provide fluid communication into the airfoil 68, are often subject to significant loading. To accommodate the loading, the attachment and neck sections 64, 66 are configured with robust mechanical strength and stiffness. The cooling air passages 90 within an airfoil 68, in contrast, typically include W2W cooling air passages 90B and center cooling air passages 90A defined by relatively narrow interior walls (sometimes referred to as "ribs").

Aspects of the present disclosure are directed to rotor blades 58 with improved cooling air passage transition from the attachment section 64 to the airfoil 68. Examples of cooling air passages within an airfoil 68 (e.g., center cooling air passages, W2W cooling air passages) are detailed above as they may be disposed within an airfoil 68 and to indicate the relationship between the airfoil cooling air passages 90 and the attachment section/neck section cooling air passages 190. To facilitate the description herein, a cooling air passage 190 disposed within the attachment and neck sections 64, 66 of the rotor blade 58 that connects with a center cooling air passage 90A within the airfoil 68, is referred to as a center cooling air passage 190A, and a cooling air passage 190 disposed within the attachment and neck sections 64, 66 that connects with a W2W cooling air passage 90B within the airfoil 68, will be referred to as a W2W cooling air passage 190B.

Figure 7:
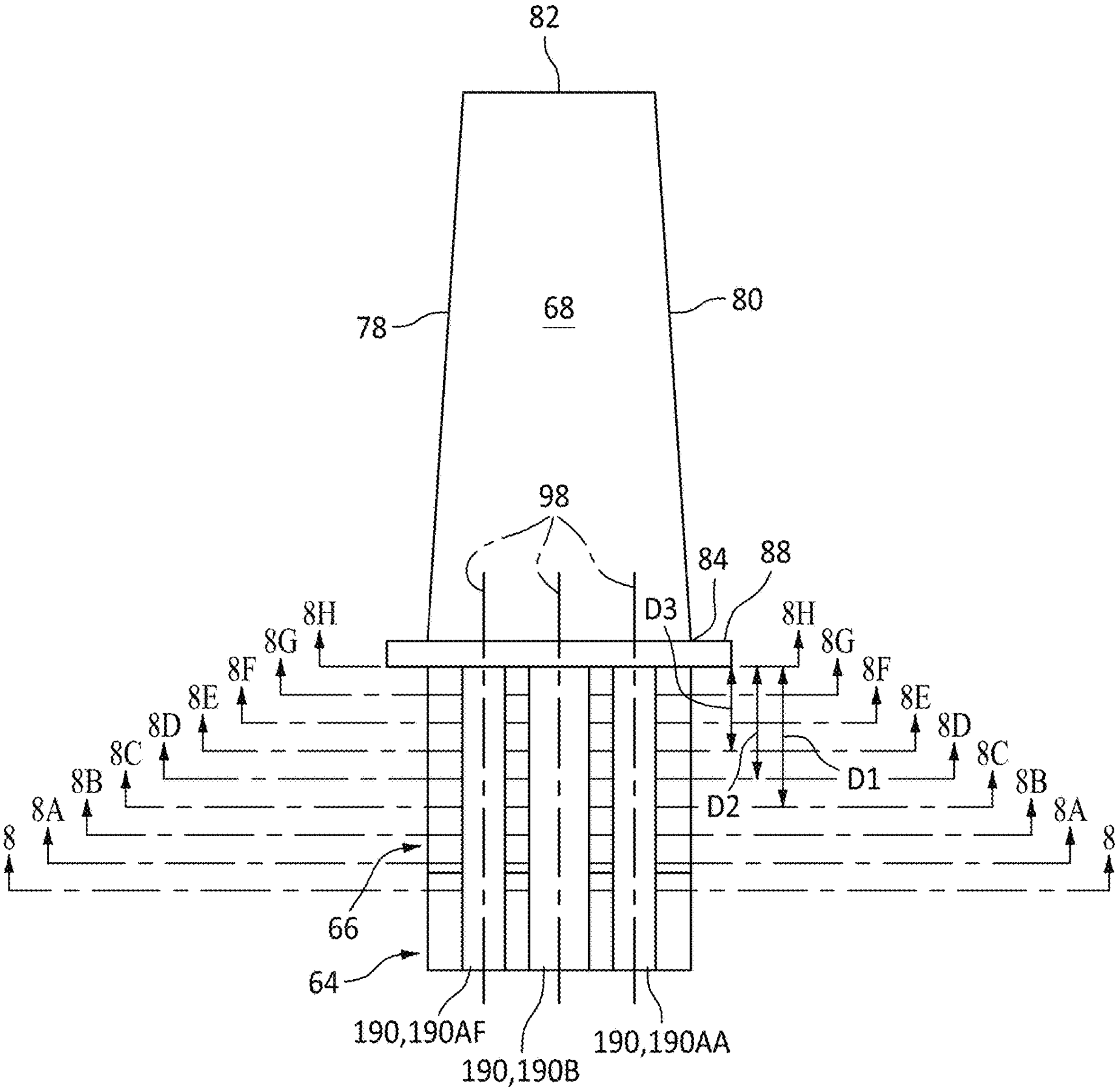
FIG. 7 is a diagrammatic view of a rotor blade illustrating sectional cut lines.
Figure 8:
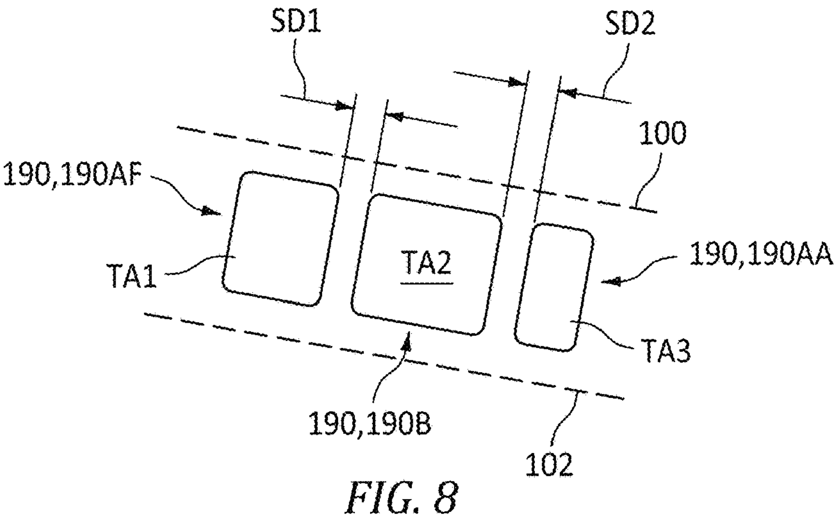
FIGS. 8-8H are diagrammatic views of an embodiment of cooling air passages within an attachment section or a neck section of a rotor blade at the sectional plane lines indicated in FIG. 7.
Figure 8A:
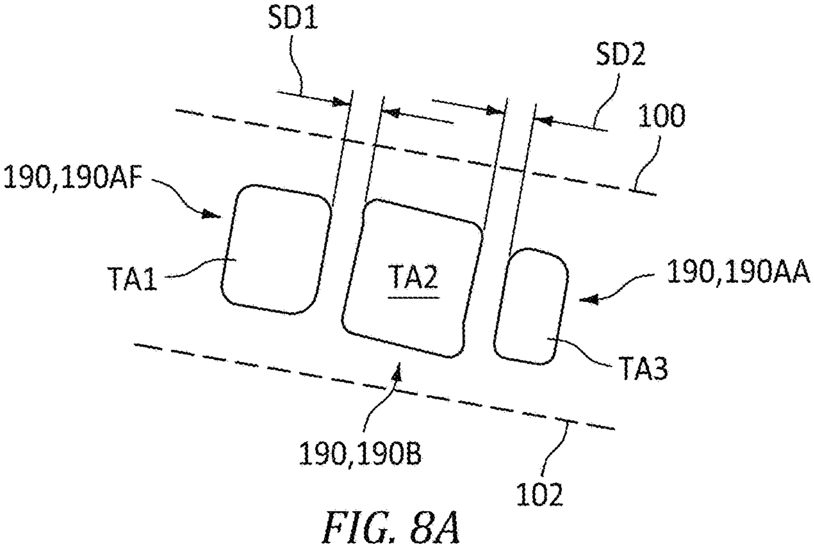
Figure 8B:
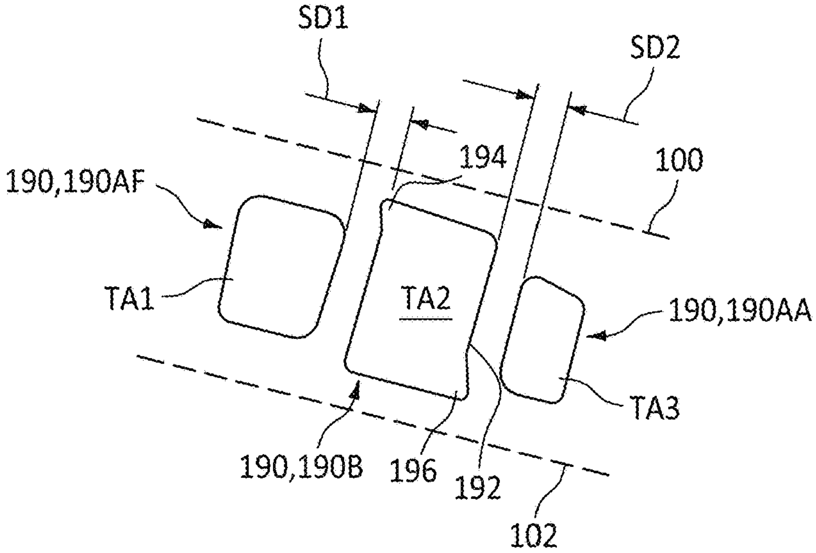
Figure 8C:
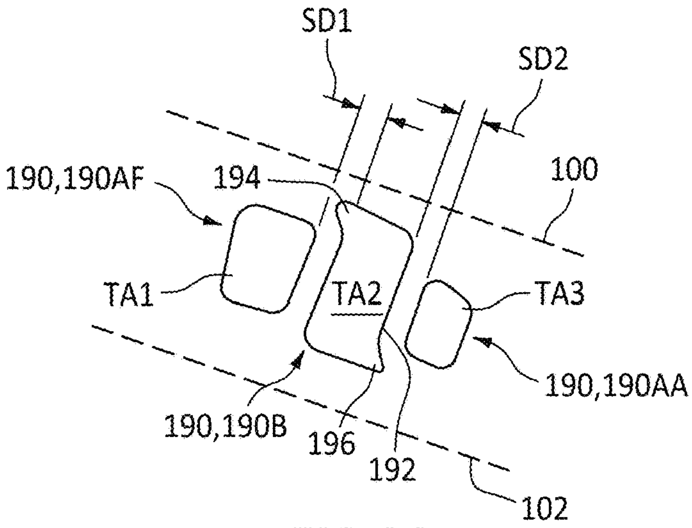
Figure 8D:
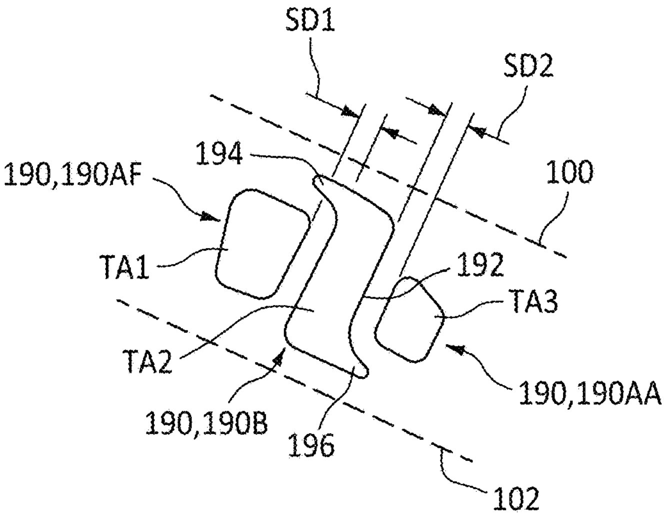
Figure 8E:
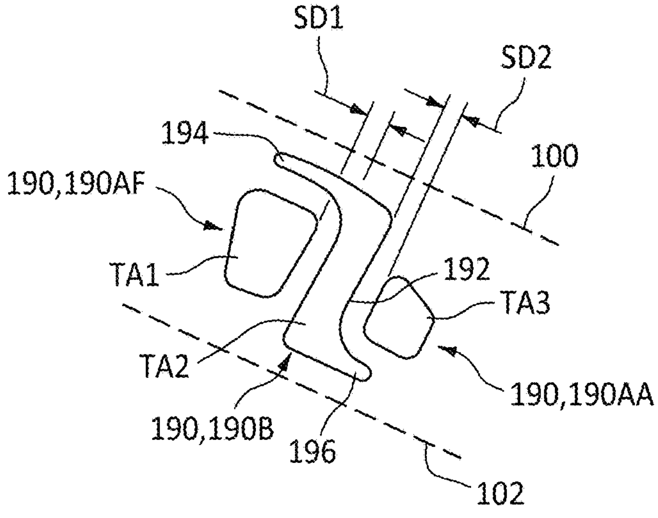
Figure 8F:
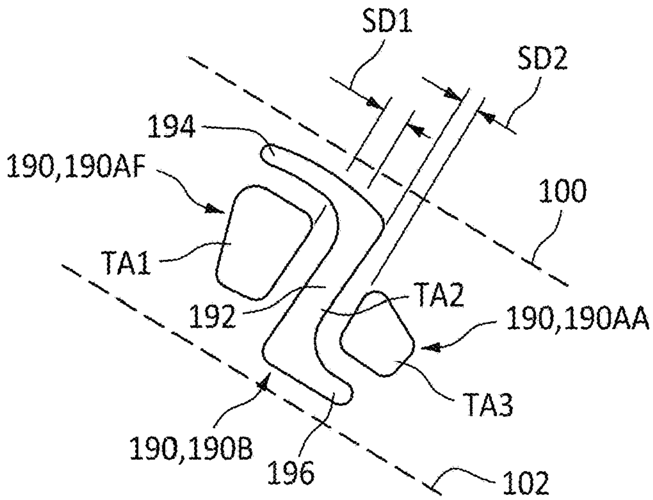
Figure 8G:
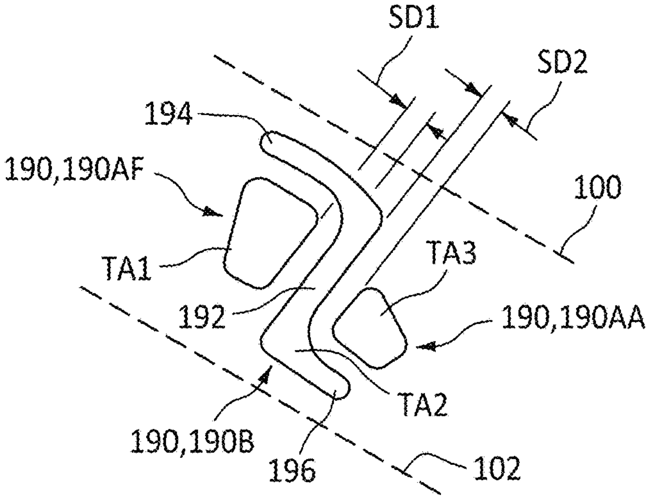

FIGS. 7 and 8-81 illustrate transitions for a W2W cooling air passage 190B and a pair of center cooling air passages 190A; i.e., a forward center cooling air passage 190AF disposed on a forward side of the W2W cooling air passage 190B, and an aft center cooling air passage 190AA disposed on an aft side of the W2W cooling air passage 190B. The example shown in FIGS. 7 and 8-81 illustrates a Z-shaped W2W cooling passage 190B disposed between a forward center cooling air passage 190AF and an aft center cooling air passage 190AA.

FIG. 7 diagrammatically illustrates a rotor blade 58 with sectional plane cut lines within the attachment section 64 and in the neck section 66. The sectional planes extend through the Z-shaped W2W cooling air passage 190B, the forward center cooling air passage 190AF, and the aft center cooling air passage 190AA. Each of the aforesaid passages 190AF, 190B, 190AA is shown extending along a respective radial centerline 98 for illustration purposes. The present disclosure does not require the aforesaid passages 190AF, 190B, 190AA (and therefore their radial centerline 98) to extend along a straight line between the base surface 70 and the airfoil root end 84.

Figure 8H:
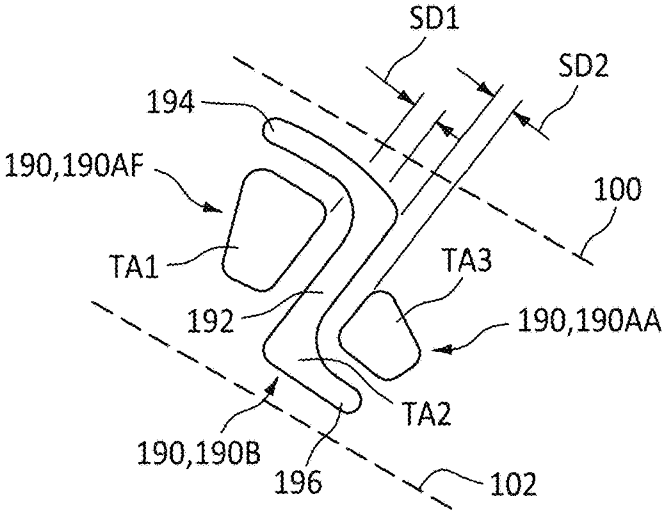
Figure 8I:
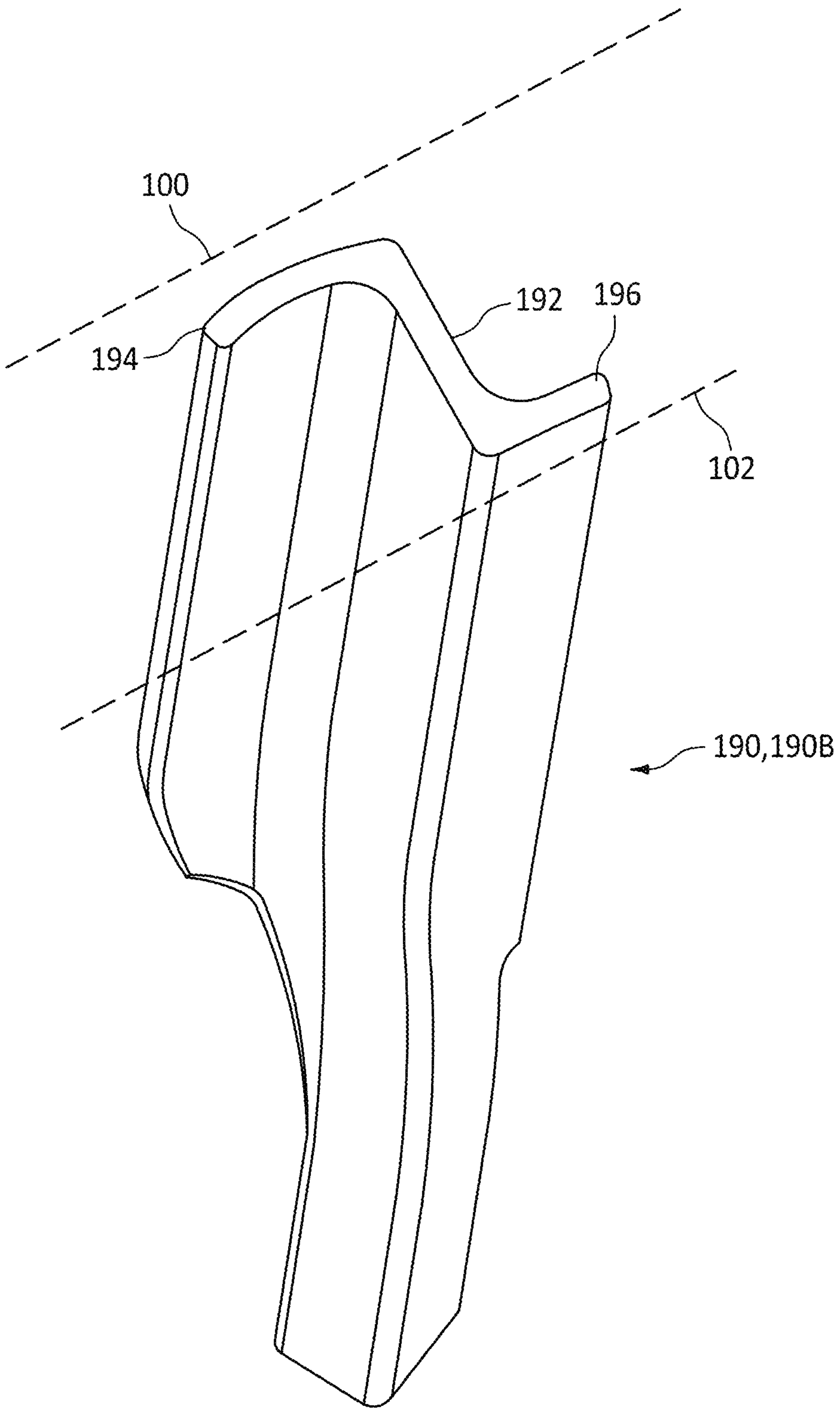

FIGS. 8-8H diagrammatically illustrate the cooling passages at the sectional plane lines indicated in FIG. 7. Each sectional plane line is representative of a cross-sectional plane that is disposed generally perpendicular to the axis (e.g., the radial centerline 98) of the cooling passages 190AF, 190B, 190AA within the attachment section 64, and the cross-sectional planes may be considered parallel one another. FIG. 81 diagrammatically illustrates a geometric representation of the Z-shaped W2W cooling passage 190B. As can be seen in FIG. 81, the W2W cooling air passage 190B may not extend directly along a straight line between the base surface 70 and the airfoil root end 84; e.g., the radial centerline 98 may deviate slightly towards the suction side or the pressure side. To be clear, each of the geometric shapes shown in FIGS. 8-8H diagrammatically represents a cooling air passage 190 and the spacing therebetween. FIGS. 8-8H illustrate the transition of three cooling air passages 190 to illustrate aspects of the present disclosure. The present disclosure is not limited to a rotor blade 58 that has three cooling passages 190 passing through the attachment and neck sections 64, 66; e.g., the present disclosure may be implemented in a rotor blade 58 having a plurality of cooling passages 190 passing through the attachment and neck sections 64, 66. As will be detailed herein, the sectional plane lines are sequentially positioned with sectional plane line 8-8 disposed within the attachment section 64 and sectional planes lines 8A-8A through 8H-8H disposed within the neck section 66.

FIGS. 8-8H illustrate the cross-sectional geometry of a W2W cooling air passage 190B disposed between a forward center cooling air passage 190AF, and an aft center cooling air passage 190AA. As will be described herein, the W2W cooling air passage 190B transitions to a Z-shaped passage in the direction from the attachment section 64 to the airfoil root end 84. All three cooling passages 190AF, 190B, 190AA are exposed at the base surface 70 of the attachment section 64 and extend through the attachment section 64 and the neck section 66. At the intersection of the neck section 66 and the airfoil root end 84, the passages 190AF, 190B, 190AA are in fluid communication with cooling air passages 90 disposed within the airfoil 68.

At the sectional plane denoted by the sectional line 8-8, the forward center cooling air passage 190AF, the W2W cooling air passage 190B, and the aft center cooling air passage 190AA each has a rectangular cross-sectional shape. The corners of each rectangularly shaped passage shape are rounded (i.e., filleted) to mitigate stress concentration. The forward center cooling air passage 190AF is separated from the W2W cooling air passage 190B by a separation distance "SD1" and the aft center cooling air passage 190AA is separated from the W2W cooling air passage 190B by a separation distance "SD2"; see FIG. 8. SD1 and SD2 represent the thickness of a rib separating the respective cooling passages 190AF and 190B, and 190B and 190AA. SD1 and SD2 may equal one another or one may be larger than the other. The forward center cooling air passage 190AF may have a total cross-sectional area equal to TA1. The W2W cooling air passage 190B may have a total cross-sectional area equal to TA2. The aft center cooling air passage 190AA may have a total cross-sectional area equal to TA3.

The sequential cross-sectional plane views of the forward center cooling air passage 190AF, the W2W cooling air passage 190B, and the aft center cooling air passage 190AA shown in FIGS. 8A-8D illustrate the aforesaid passages geometrically transitioning from the rectangular geometries shown in FIG. 8 in the direction toward the airfoil root end 84. The dashed line 100 disposed above the passages 190AF, 190B, 190AA diagrammatically illustrates the suction side of the rotor blade 58, and the dashed line 102 disposed below the passages 190AF, 190B, 190AA diagrammatically illustrates the pressure side of the rotor blade 58. The forward center cooling air passage 190AF transitions from an initial rectangular shape to a trapezoidal shape as an example. The present disclosure is not limited to any particular forward center cooling passage geometry at any point; i.e., the present disclosure is not limited to a forward center cooling passage geometry that initially has a rectangular shape and transitions to a trapezoidal shape. The aft center cooling air passage 190AA transitions from an initial rectangular shape to a shape having two opposing sides generally parallel with one another and two opposing sides skewed relative to one another; e.g., at a convergent angle. The present disclosure is not limited to any particular aft center cooling passage geometry at any point; i.e., the present disclosure is not limited to an aft center cooling passage geometry that initially has a rectangular shape and transitions to a polygonal shape. A suction side segment 194 and a pressure side segment 196 are shown progressively extending outwardly at opposing corners (diagonally across from one another) of the W2W cooling air passage 190B in FIGS. 8 to 8D. The portion of the W2W cooling air passage extending between the suction side segment 194 and the pressure side segment 196 is referred to hereinafter as the central segment 192. In the cross-sectional plane shown in FIG. 8D-8D, a portion of the suction side segment 194 begins to be disposed outside of the forward center cooling passage 190AF on the suction side (i.e., between the forward center cooling passage 190AF and the exterior of the suction side 100) and a portion of the pressure side segment 196 begins to be disposed outside of the aft center cooling passage 190AA on the pressure side (i.e., between the aft center cooling passage 190AA and the exterior of the pressure side 102).

The sequential cross-sectional plane views of the forward center cooling air passage 190AF, the W2W cooling air passage 190B, and the aft center cooling air passage 190AA shown in FIGS. 8E-8H illustrate the aforesaid passages progressively geometrically transitioning. Specifically, the suction side and pressure side segments 194, 196 progressively extend further outwardly at the opposing corners and the central segment 192 becomes narrower. As can be seen in FIGS. 8E-8H, the suction side segment 194 progressively transitions outwardly so as to be outside of the forward center cooling air passage 190AF on the suction side and the pressure side segment 196 progressively transitions outwardly so as to be outside of the aft center cooling air passage 190AA on the pressure side. In FIG. 8H (i.e., the sectional plane at or adjacent the root end of the airfoil 68), the Z-shape of the W2W cooling air passage 190 is complete. Between the attachment section 64 and the airfoil root end 84, the forward center cooling air passage 190AF and the aft center cooling air passage 190AA also progressively geometrically transition albeit to a lesser degree. As stated above, FIG. 81 diagrammatically illustrates a geometric representation of the Z-shaped W2W cooling passage geometrically transitioning from the attachment section 64 to the airfoil root end 84.

Figure 9:
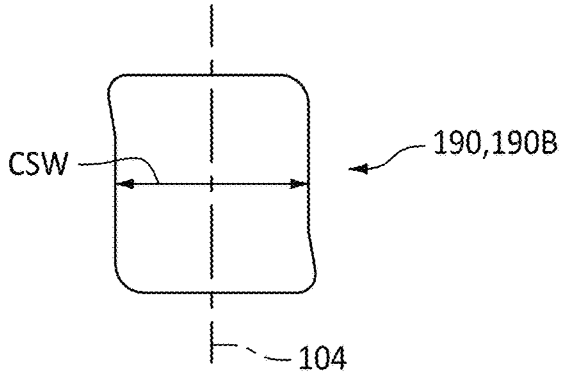
FIGS. 9-9D diagrammatically show annotated views of certain cross-sectional plane views shown in FIGS. 8-8H.
Figure 9A:
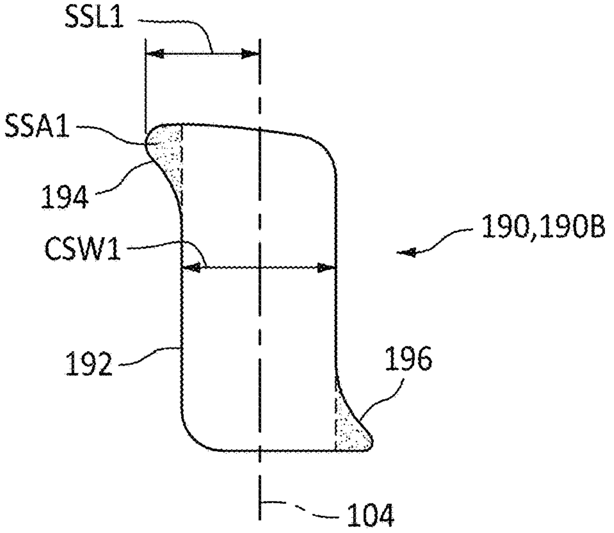
Figure 9B:
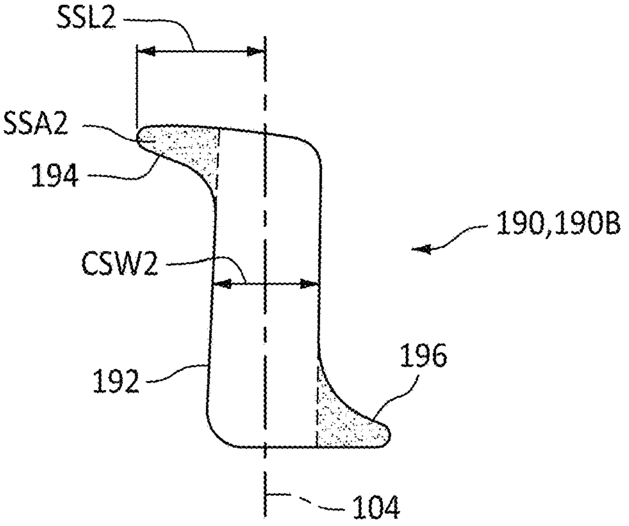
Figure 9C:
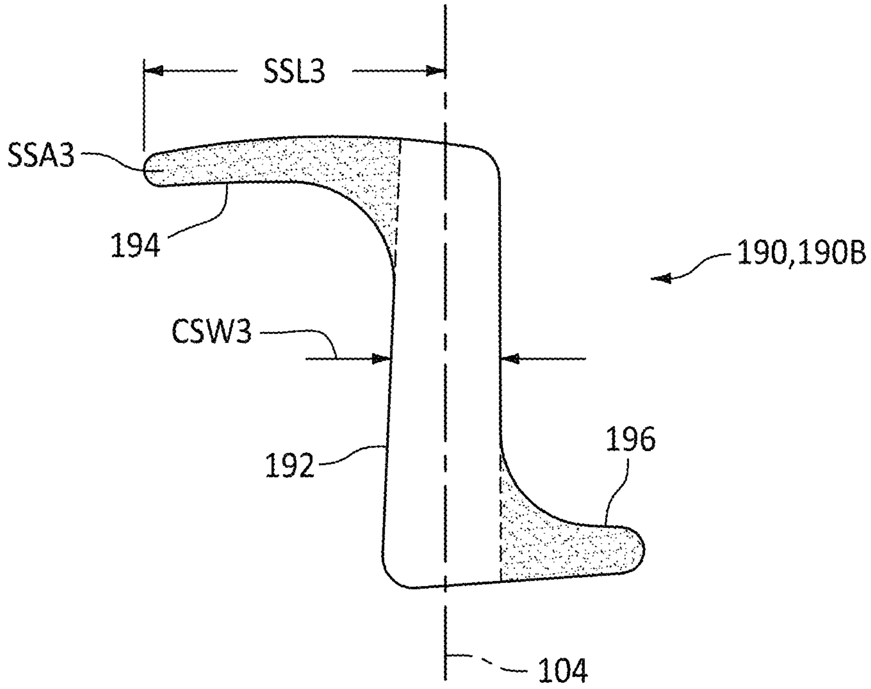
Figure 9D:
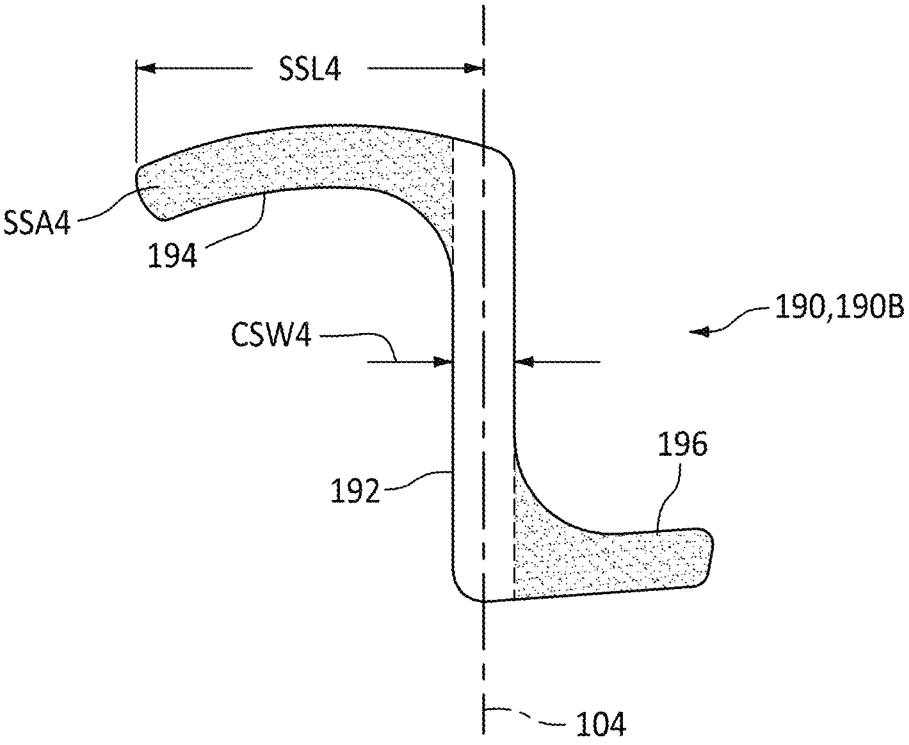

FIGS. 9-9D diagrammatically show the cross-sectional plane views of the W2W cooling air passage 190B. Each cross-sectional plane view is shown with a suction side to pressure side centerline 104 that centrally bisects the W2W cooling air passage 190B. FIG. 9 shows the cross-sectional plane view of the W2W cooling air passage 190B at the 8A-8A sectional plane. In this view, there is essentially no suction side segment 194 or pressure side segment 196. The W2W cooling air passage 104 has a width CSW.

FIG. 9A shows the cross-sectional plane view of the W2W cooling air passage 190B at the 8C-8C sectional plane. In this view, the suction side segment 194 has an area SSA1 (shown shaded) and extends out from the centerline 104 a distance SSL1. The portion (i.e., the central segment 192) of the W2W cooling air passage 190B that extends between the suction side segment 194 and the pressure side segment 196 has a width CSW1. The 8C-8C sectional plane may be described as being disposed a distance D1 from sectional plane 8H-8H (which is located at or adjacent the airfoil root end 84); e.g., see FIG. 7.

FIG. 9B shows the cross-sectional plane view of the W2W cooling air passage 190B at the 8D-8D sectional plane. In this view, the suction side segment 194 has an area SSA2 (shown shaded) and extends out from the centerline 104 a distance SSL2. The central segment 192 of the W2W cooling air passage 190B has a width CSW2. The 8D-8D sectional plane may be described as being disposed a distance D2 from sectional plane 8H-8H; e.g., see FIG. 7.

FIG. 9C shows the cross-sectional plane view of the W2W cooling air passage 190B at the 8E-8E sectional plane. In this view, the suction side segment 194 has an area SSA3 (shown shaded) and extends out from the centerline 104 a distance SSL3. The central segment 192 of the W2W cooling air passage 190B has a width CSW3. The 8E-8E sectional plane may be described as being disposed a distance D3 from sectional plane 8H-8H; e.g., see FIG. 7.

FIG. 9D shows the cross-sectional plane view of the W2W cooling air passage 190B at the 8H-8H sectional plane. In this view, the suction side segment 194 has an area SSA4 (shown shaded) and extends out from the centerline 104 a distance SSL4. The central segment has a width CSW4.

As the W2W cooling air passage 190*b* transitions in the direction from the attachment section 64 to the airfoil root end 84, the suction side segment 194 area increases; e.g., SSA4>SSA3>SSA2>SSA1. The present disclosure does not require that increase in area to be continuous, however; e.g., SSA4>SSA3; SSA3=SSA2; SSA2>SSA1, and the like. As the W2W cooling air passage 190B transitions in the direction from the attachment section 64 to the airfoil root end 84, the suction side segment 194 length may increase; i.e., SSL4>SSL3>SSL2>SSL1. The present disclosure does not require that increase in length to be continuous, however; e.g., SSA4=SSA3; SSA3>SSA2; SSA2>SSA1, and the like.

The above description is provided in terms of the suction side segment 194 only, to facilitate the description. The above description may also be applied to the pressure side segment 196. The pressure side segment 196 may transition at the same rate (i.e., changes in length and/or area) as the suction side segment 194, or transition at a different rate. The present disclosure does not require the pressure side segment 196 and the suction side segment 194 to mirror one another.

As the W2W cooling air passage 190B transitions in the direction from the attachment section 64 to the airfoil root end 84, the width of the central segment 192 decreases; e.g., CSW4<CSW3<CSW2<CSW1. The present disclosure does not require that decrease in width to be continuous, however; e.g., CSW4<CSW3; CSW3=CSW2; CSW2<CSW1, and the like.

In some embodiments, the entire cross-sectional area (TA2) of the W2W cooling air passage 190B (i.e., the combined cross-sectional areas of the suction side segment 194, the central segment 192, and the pressure side segment 196) may remain constant (or substantially constant, increasing or decreasing by 15% or less variation) as the W2W cooling air passage 190B progressively transitions in the direction from the attachment section 64 to the airfoil root end 84. The increasing area of the suction side and pressure side segments 194, 196 during the transition is matched with a decreasing cross-sectional area in the central segment 192.

In some embodiments, the total cross-sectional area (TA1) of the forward center cooling air passage 190AF and/or the total cross-sectional area (TA3) of the aft center cooling air passage 190AA may also remain constant (or substantially constant-15% or less variation) as they transition in the direction from the attachment section 64 to the airfoil root end 84.

In some embodiments, the separation distance (SD1) between the forward center cooling air passage 190AF and the W2W cooling air passage (i.e., the central segment 192)

may remain constant (or substantially constant-15% or less variation) as the passages 190AF, 190B progressively transition in the direction from the attachment section 64 to the airfoil root end 84.

In some embodiments, the separation distance (SD2) between the aft center cooling air passage 190AA and the W2W cooling air passage (i.e., the central segment 192) may remain constant (or substantially constant-15% or less variation) as the passages 190AA, 190B progressively transition in the direction from the attachment section 64 to the airfoil root end 84.

Figure 10:
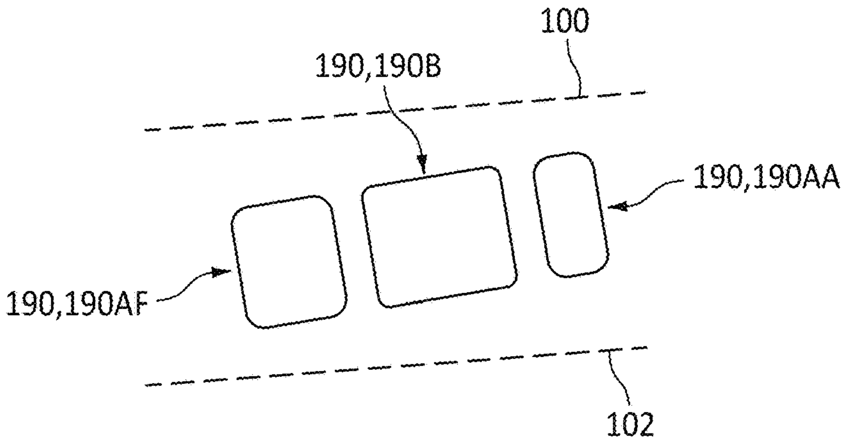
FIGS. 10-10D are diagrammatic views of an embodiment of cooling air passages within an attachment section or a neck section of a rotor blade.
Figure 10A:
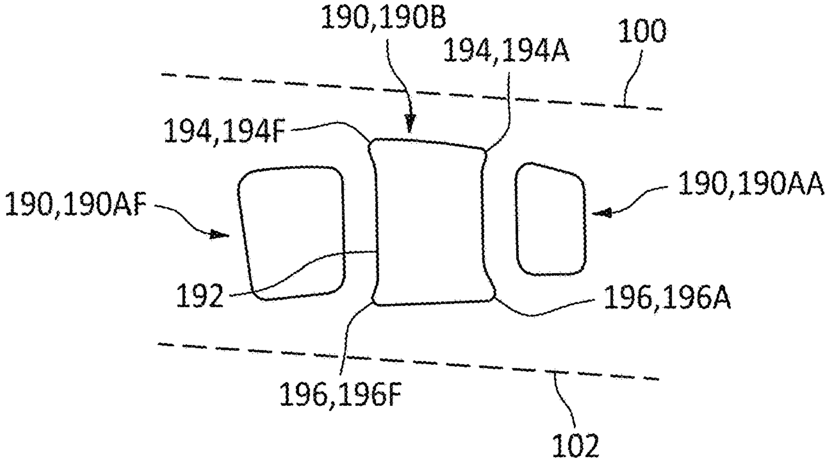
FIG. 10E is a diagrammatic solid body representation of a cooling air passage shown in the sectional views of FIGS. 10-10D.
Figure 10B:
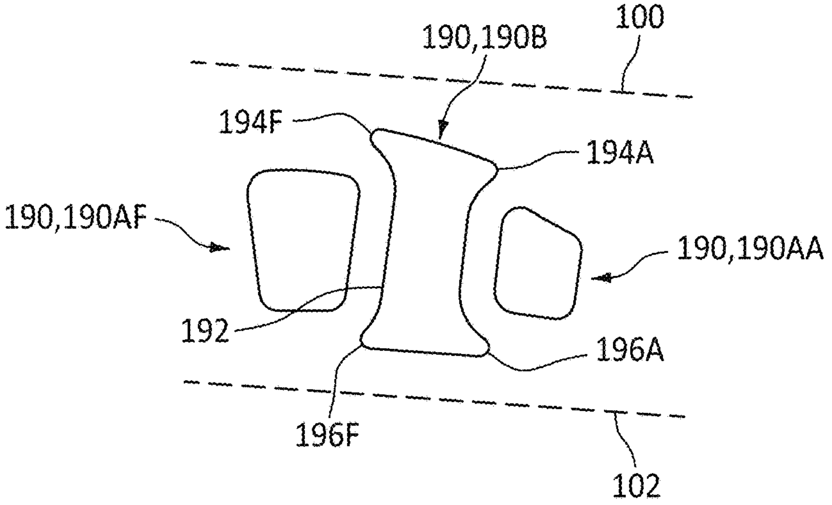
Figure 10C:
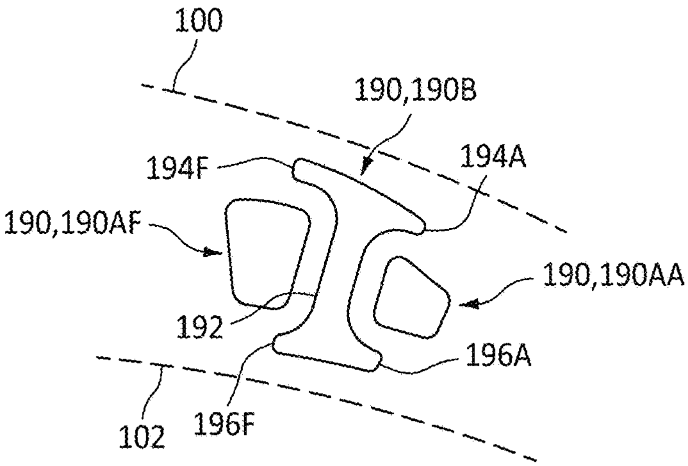
Figure 10D:
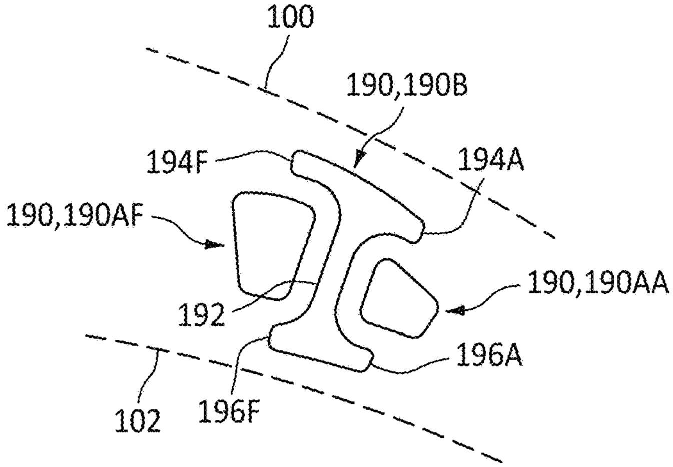
Figure 10E:
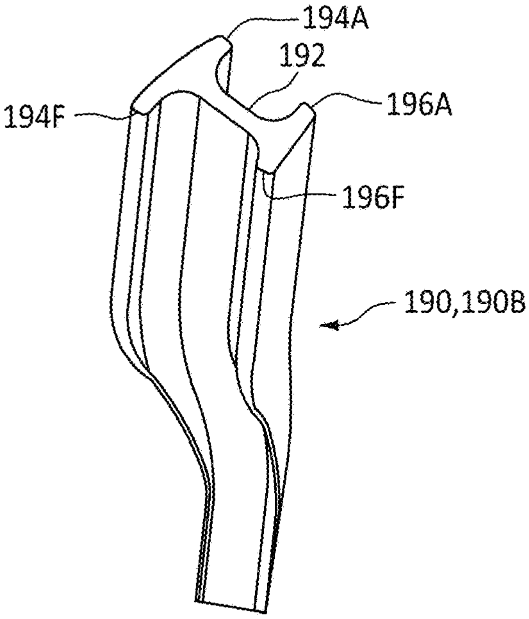

The present disclosure progressive geometric transitioning of W2W cooling passage 190B from the attachment section 64 to the airfoil root end 84 is not limited to the above-described Z-shaped passage. FIGS. 10-10D illustrate the cross-sectional geometry of a W2W cooling air passage 190B disposed between a forward center cooling air passage 190AF and an aft center cooling air passage 190AA. In this example, the W2W cooling air passage 190B progressively transitions to an I-shaped passage extending between the suction and pressure sides (diagrammatically shown as dashed lines 100, 102 disposed on opposite sides). Like the example shown in FIG. 8, the forward center cooling air passage 190AF, the W2W cooling air passage 190B, and the aft center cooling air passage 190AA begin as rectangular geometries in the sectional plane shown in FIG. 10. From there, the cooling passages 190AF, 190B, 190AA transition in a direction from the attachment section 64 to the airfoil root end 84 to an I-shaped W2W cooling passage; e.g., FIG. 10D represents a sectional plane at or adjacent the airfoil root end 84. In this embodiment, the central segment 192 of the I-shaped cooling air passage is disposed between the forward and aft center cooling air passages 190AF, 190AA, and the suction side segment 194 includes a forward suction side segment 194F and an aft suction side segment 194A, and the pressure side segment 196 includes a forward pressure side segment 196F and an aft pressure side segment 196A. The forward suction side segment 194F is disposed outside of the forward center cooling air passage 190AF on the suction side, the aft suction side segment 194A is disposed outside of the aft center cooling air passage 190AA on the suction side, the forward pressure side segment 196F is disposed outside of the forward center cooling air passage 190AF on the pressure side, and the aft pressure side segment 196A is disposed outside of the aft center cooling air passage 190AA on the pressure side. FIG. 10E diagrammatically illustrates a geometric representation of the I-shaped W2W cooling passage 190B transitioning from the attachment section 64 to the airfoil root end 84.

Also like the Z-shaped example shown in FIGS. 8-8H, the cross-sectional area of the I-shaped W2W cooling air passage 190B may remain constant (or substantially constant as defined above) as it transitions in a direction from the attachment section 64 to the airfoil root end 84. The cross-sectional area of the forward center cooling air passage 190AF and/or the cross-sectional area of the aft center cooling air passage 190AA may also remain constant/substantially constant in the transition. In the I-shaped W2W cooling air passage 190B, the separation distance (SD1) between the forward center cooling air passage 190AF and the W2W cooling air passage 190B, and/or the separation distance (SD2) between the aft center cooling air passage 190AA and the W2W cooling air passage 190B may also remain constant (or substantially constant as defined above) in the progressive transition from the attachment section 64 to the airfoil root end 84.

Other non-limiting examples of a W2W cooling passage having a suction side segment 194 or a pressure side segment 196 (or both) include a U-shaped cooling passage and an L-shaped cooling passage (e.g., see FIG. 6A), or the like.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, “comprises” means “includes.” Thus, “comprising A or B,” means “including A or B, or A and B,” without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A rotor blade for a gas turbine engine, comprising:

a suction side;

a pressure side;

an airfoil that extends radially between a tip end and an airfoil root end, the airfoil including a plurality of internal cooling air passages;

an attachment section having a base surface; and a neck section disposed between the attachment section and the airfoil;

wherein a forward center cooling air passage is open at the base surface and extends through the attachment section and the neck section and is in fluid communication with the plurality of internal cooling air passages; and wherein an aft center cooling air passage is open at the base surface and extends through the attachment section and the neck section and is in fluid communication with the plurality of internal cooling air passages;

wherein a wall to wall (W2W) cooling air passage is open at the base surface and extends through the attachment section and the neck section and is in fluid communication with the plurality of internal cooling air passages, and the W2W cooling air passage is disposed between the forward center cooling air passage and the aft center cooling air passage;

wherein in a transition in a direction from a cross-sectional plane disposed in the attachment section to the airfoil root end, a side segment progressively extends outwardly from the W2W cooling air passage;

wherein in a first cross-sectional plane that extends through the neck section and is perpendicular to the W2W cooling air passage, the side segment has a first length L1 and a first area A1, and in a second cross-sectional plane that extends through the neck section and is perpendicular to the W2W cooling air passage, the side segment has a second length L2 and a second area A2;

wherein the first cross-sectional plane is spaced apart from the airfoil root end a first distance D1, and the second cross-sectional plane is spaced apart from the airfoil root end a second distance D2, and the first distance D1 is greater than the second distance D2; and wherein the second length L2 is greater than the first length L1.

2. The rotor blade of claim 1, wherein the second area A2 is greater than the first area A1.

3. The rotor blade of claim 2, wherein in a third cross-sectional plane that extends through the neck section and is perpendicular to the W2W cooling air passage, the side segment has a third length L3 and a third area A3; and wherein the third cross-sectional plane is spaced apart from the airfoil root end a third distance D3, and the third distance D3 is less than the second distance D2; and wherein the third area A3 is greater than the second area A2.

4. The rotor blade of claim 3, wherein at the third cross-sectional plane, a portion of the side segment is disposed outside of the forward center cooling air passage.

5. The rotor blade of claim 4, wherein the portion of the side segment is disposed between the forward center cooling air passage and a suction side surface of the neck section.

6. The rotor blade of claim 3, wherein at the third cross-sectional plane, a portion of the side segment is disposed outside of the aft center cooling air passage.

7. The rotor blade of claim 6, wherein the portion of the side segment is disposed between the aft center cooling air passage and a pressure side surface of the neck section.

8. The rotor blade of claim 1, wherein the forward center cooling air passage is separated from the W2W cooling air passage by a first separation distance at the base surface; and wherein the W2W cooling air passage includes a central segment at the airfoil root end, and at the airfoil root end the forward center cooling air passage is separated from the central segment by a second separation distance; and wherein the first separation distance deviates from the second separation distance by fifteen percent or less.

9. The rotor blade of claim 1, wherein the aft center cooling air passage is separated from the W2W cooling air passage by a first separation distance at the base surface; and wherein the W2W cooling air passage includes a central segment at the airfoil root end, and at the airfoil root end the aft center cooling air passage is separated from the central segment by a second separation distance; and wherein the first separation distance deviates from the second separation distance by fifteen percent or less.

10. The rotor blade of claim 1, wherein the W2W cooling air passage has a first total cross-sectional area at the base surface; and wherein the W2W cooling air passage has a second total cross-sectional area at the airfoil root end; and wherein the first total cross-sectional area deviates from the second total cross-sectional area by fifteen percent or less.

11. The rotor blade of claim 1, wherein the forward center cooling air passage has a first total cross-sectional area at the base surface; and wherein the forward center cooling air passage has a second total cross-sectional area at the airfoil root end; and wherein the first total cross-sectional area deviates from the second total cross-sectional area by fifteen percent or less.

12. The rotor blade of claim 1, wherein the aft center cooling air passage has a first total cross-sectional area at the base surface; and wherein the aft center cooling air passage has a second total cross-sectional area at the airfoil root end; and wherein the first total cross-sectional area deviates from the second total cross-sectional area by fifteen percent or less.

13. A rotor blade for a gas turbine engine, comprising:

a suction side;

a pressure side;

an airfoil that extends radially between a tip end and an airfoil root end, the airfoil including a plurality of internal cooling air passages;

an attachment section having a base surface; and a neck section disposed between the attachment section and the airfoil;

wherein a forward center cooling air passage is open at the base surface and extends through the attachment section and the neck section and is in fluid communication with the plurality of internal cooling air passages; and wherein an aft center cooling air passage is open at the base surface and extends through the attachment section and the neck section and is in fluid communication with the plurality of internal cooling air passages; and wherein a wall to wall (W2W) cooling air passage is open at the base surface and extends through the attachment section and the neck section and is in fluid communication with the plurality of internal cooling air passages, and the W2W cooling air passage is disposed between the forward center cooling air passage and the aft center cooling air passage; and wherein in a transition in a direction from a cross-sectional plane disposed in the attachment section to the airfoil root end, a suction side segment progressively extends outwardly from the W2W cooling air passage and a pressure side segment progressively extends outwardly from the W2W cooling air passage;

wherein in a first cross-sectional plane that extends through the neck section and is perpendicular to the W2W cooling air passage, the suction side segment (SSS) has a first SSS length SSL1 and a first SSS area SSA1, and in a second cross-sectional plane that extends through the neck section and is perpendicular to the W2W cooling air passage, the suction side segment has a second SSS length SSL2 and a second SSS area SSA2;

wherein in the first cross-sectional plane, the pressure side segment (PSS) has a first PSS length PSL1 and a first PSS area PSA1, and in the second cross-sectional plane, the pressure side segment has a second PSS length PSL2 and a second PSS area PSA2;

wherein the first cross-sectional plane is spaced apart from the airfoil root end a first distance D1, and the second cross-sectional plane is spaced apart from the airfoil root end a second distance D2, and the first distance D1 is greater than the second distance D2; and wherein the second SSS length SSL2 is greater than the first SSS length SSL1, and the second PSS length PSL2 is greater than the first PSS length PSL1.

14. The rotor blade of claim 13, wherein the suction side segment and the pressure side segment are disposed diagonally across from one another.

15. The rotor blade of claim 14, wherein the second SSS area SSA2 is greater than the first SSS area SSA1; and the second PSS area PSA2 is greater than the first PSS area PSA1.

16. The rotor blade of claim 13, wherein at the second cross-sectional plane, a portion of the suction side segment is disposed outside of the forward center cooling air passage on the suction side, and a portion of the pressure side segment is disposed outside of the aft center cooling air passage on the pressure side.

17. The rotor blade of claim 13, wherein the suction side segment includes a forward suction side segment and an aft suction side segment, and the pressure side segment includes a forward pressure side segment and an aft pressure side segment.

18. A rotor blade for a gas turbine engine, comprising:

a suction side;

a pressure side;

an airfoil that extends radially between a tip end and an airfoil root end, the airfoil including a plurality of internal cooling air passages;

an attachment section having a base surface; and a neck section disposed between the attachment section and the airfoil;

wherein a forward center cooling air passage is open at the base surface and extends through the attachment section and the neck section and is in fluid communication with the plurality of internal cooling air passages; and wherein an aft center cooling air passage is open at the base surface and extends through the attachment section and the neck section and is in fluid communication with the plurality of internal cooling air passages;

wherein a wall to wall (W2W) cooling air passage is open at the base surface and extends through the attachment section and the neck section and is in fluid communication with the plurality of internal cooling air passages, and the W2W cooling air passage is disposed between the forward center cooling air passage and the aft center cooling air passage;

wherein in a transition in a direction from a cross-sectional plane disposed in the attachment section to the airfoil root end, a suction side segment progressively extends outwardly from the W2W cooling air passage and a pressure side segment progressively extends outwardly from the W2W cooling air passage; and wherein the suction side segment includes a forward suction side segment and an aft suction side segment, and the pressure side segment includes a forward pressure side segment and an aft pressure side segment.

* * * * *